(12) United States Patent
Acharya

(10) Patent No.: US 6,775,413 B1
(45) Date of Patent: Aug. 10, 2004

(54) TECHNIQUES TO IMPLEMENT ONE-DIMENSIONAL COMPRESSION

(75) Inventor: Tinku Acharya, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 476 days.

(21) Appl. No.: 09/666,486

(22) Filed: Sep. 18, 2000

(51) Int. Cl.[7] .............................. G06K 9/46; H04N 1/32
(52) U.S. Cl. .................................. 382/245; 358/426.16
(58) Field of Search ....................... 358/426.16, 426.04, 358/426.06, 444, 523, 426.05, 115, 116, 117; 382/246, 245, 244, 232; 341/63, 59

(56) References Cited

U.S. PATENT DOCUMENTS

| | | | |
|---|---|---|---|
| 4,040,093 A | 8/1977 | Nakagome et al. | 382/245 |
| 4,185,303 A | 1/1980 | Mounts et al. | 382/238 |
| 4,245,257 A | 1/1981 | Yamazaki et al. | 382/244 |
| 4,486,784 A | 12/1984 | Abraham et al. | 382/245 |
| 4,558,371 A | 12/1985 | Rallapalli et al. | 358/426.16 |
| 4,760,461 A | 7/1988 | Sato | 358/426.02 |
| 5,196,945 A | 3/1993 | Ho et al. | 341/63 |
| 5,875,122 A | 2/1999 | Acharya | 708/407 |
| 5,995,210 A | 11/1999 | Acharya | 356/73 |
| 6,009,201 A | 12/1999 | Acharya | 382/232 |
| 6,009,206 A | 12/1999 | Acharya | 382/251 |
| 6,047,303 A | 4/2000 | Acharya | 708/407 |
| 6,091,851 A | 7/2000 | Acharya | 382/167 |
| 6,094,508 A | 7/2000 | Acharya et al. | 382/199 |
| 6,108,453 A | 8/2000 | Acharya | 382/254 |
| 6,124,811 A | 9/2000 | Acharya et al. | 341/63 |
| 6,130,960 A | 10/2000 | Acharya | 382/167 |
| 6,151,069 A | 11/2000 | Dunton et al. | 348/220.1 |
| 6,151,415 A | 11/2000 | Acharya et al. | 382/255 |
| 6,166,664 A | 12/2000 | Acharya | 341/63 |

(List continued on next page.)

FOREIGN PATENT DOCUMENTS

| | | | |
|---|---|---|---|
| EP | 0288219 A2 | 10/1988 | |
| JP | 51-013748 | * 1/1986 | ............ H04N/1/00 |

OTHER PUBLICATIONS

Hunter, et al., "International Digital Facsimile Coding Standards", 1980 IEEE, British Post Office Centre, Martlesham Heath, England, pp. 854–867.

Acharya, "A Memory Based VLSI Architecture for Image Compression" Applicaion No: 08/885,415, Filed: Jun. 30, 1997, 37 pgs.

Bawolek, et al., "Infrared Correction System", Application No: 09/126,203, Filed Jul. 30, 1998, 23 Pgs.

Pazmino, et al., "Method of Compressing and/or Decompressing a Data Set Using Significance Mapping", Application No: 09/151,336, filed: Sep. 11, 1998, 25 pgs.

Tan, et al., "Robust Sequential Approach in Detecting Defective Pixels Within an Image Sensor", Application No: 09/191,310, 35 Pgs.

Acharya, et al., "Color Interpolation for a Four Color Mosaic Pattern", Application No: 09/199,836, Filed. Nov. 24, 1998, 26 Pgs.

(List continued on next page.)

Primary Examiner—Cheukfan Lee
(74) Attorney, Agent, or Firm—Sharon Wong

(57) ABSTRACT

Embodiments of the present invention are disclosed in which one dimensional image compression, such as for bi-level images, is implemented. An integrated circuit includes digital logic circuitry and digital memories. The digital logic circuitry and digital memories are coupled so as to implement one dimensional compression of a bit stream to be applied to the digital logic circuitry and digital memories without performing arithmetic operations. One of the digital read only memories stores, for a plurality of run lengths, a memory address for a make up code and a memory address for a termination code for the respective run lengths.

16 Claims, 3 Drawing Sheets

| 1 | 1 | 1 | 0 | 0 | 0 | 0 | 0 | 1 | 1 | 0 | 0 | 0 | 1 |
|---|---|---|---|---|---|---|---|---|---|---|---|---|---|

U.S. PATENT DOCUMENTS

| | | |
|---|---|---|
| 6,178,269 B1 | 1/2001 | Acharya ..................... 382/277 |
| 6,195,026 B1 | 2/2001 | Acharya ...................... 345/88 |
| 6,215,908 B1 | 4/2001 | Pazmino et al. ............ 382/240 |
| 6,215,916 B1 | 4/2001 | Acharya ..................... 382/298 |
| 6,229,578 B1 | 5/2001 | Acharya et al. ............ 348/607 |
| 6,233,358 B1 | 5/2001 | Acharya ..................... 382/248 |
| 6,236,433 B1 | 5/2001 | Acharya et al. ............ 348/273 |
| 6,236,765 B1 | 5/2001 | Acharya ..................... 382/276 |
| 6,269,181 B1 | 7/2001 | Acharya ..................... 382/162 |
| 6,275,206 B1 | 8/2001 | Tsai et al. ..................... 341/60 |
| 6,285,796 B1 | 9/2001 | Acharya et al. ............ 382/246 |
| 6,292,114 B1 | 9/2001 | Tsai et al. ..................... 341/67 |
| 6,301,392 B1 | 10/2001 | Acharya ..................... 382/239 |
| 6,348,929 B1 | 2/2002 | Acharya et al. ............ 345/660 |
| 6,351,555 B1 | 2/2002 | Acharya et al. ............ 382/162 |
| 6,356,276 B1 | 3/2002 | Acharya ..................... 345/600 |
| 6,366,692 B1 | 4/2002 | Acharya ..................... 382/162 |
| 6,366,694 B1 | 4/2002 | Acharya ..................... 382/167 |
| 6,373,481 B1 | 4/2002 | Tan et al. ................... 345/788 |
| 6,377,280 B1 | 4/2002 | Acharya et al. ............ 345/667 |
| 6,381,357 B1 | 4/2002 | Tan et al. ................... 382/147 |
| 6,392,699 B1 | 5/2002 | Acharya ..................... 348/273 |

OTHER PUBLICATIONS

Acharya, "A Mathematical Model for Gray Scale and Contrast Enhancement of a Digital Image", Application No; 09/207,153, Filed: Dec. 8, 1998, 28 pgs.

Acharya, "Enhancing Image Compression Performance by morphological Processing", Application No: 09/291,810, Filed: Apr. 14, 1999, 31 Pgs.

Tan, et al., "Using an Electronic Camera to Build a File Containing Text", Application No: 09/301,753, Filed Apr. 29, 1999, 21 pgs.

Tsai, et al., "Method and Apparatus for Adaptively Sharpening an Image", Application No: 09/320,192, Filed May 26, 1999, 27 pgs.

Tan, et al., "Method and Apparatus for Adaptively Sharpening Local Image Content of an Image", Application No: 09/328,935, Filed: Jun. 9, 1999, 29 pgs.

Tan, et al., "A Hardware Efficient Wavelet–Based Video Compression Scheme", Application No: 09/342,863, Filed: Jun. 26, 1999, 32 pgs.

Tan, et al., "A Methodology for Color Correction with Noise Regulation", Application No: 09/359,831, Filed: Jul. 23, 1999, 30 pgs.

Acharya, et al., "Image Processing Method and Apparatus", Application No: 09/359,523, filed: Jul. 23, 1999, 16 pgs.

Acharya., et al, "Zerotree Encoding of Wavelet Data", Application No; 09/390,255, Filed: Sep. 3, 1999, 22 pgs.

Acharya, et al., "A Fuzzy Based Threshold Technique for Image Segmentation", Application No; 09/393,136, Filed: Sep. 10, 1999, 28 pgs.

Acharya, et al., "A Fuzzy Distinction Based Thresholding Technique for Image Segmentation", Application No: 09/393,017, Filed: Sep. 10, 1999, 29 pgs.

Acharya, "Video Motion Estimation", Application No: 09/406,032, Filed: Sep. 27, 1999, 24 pgs.

Acharya,et al., "Method of Interpolating Color Pixel Signals from a Subsampled Color Image", Application No: 09/410,800, Filed: Oct. 1, 1999, 20 pgs.

Acharya, et al., "Method of Compressing a Color Image" Application No: 09/411,697, Filed: Oct. 1, 1999, 26 pgs.

Acharya, et al., "Square Root Raised Cosine Symmetric Filter for Mobile Telecommunications" Application No: 09/429,058, Filed: Oct. 29, 1999, 36 pgs.

Acharya, "Discrete Filter", Application No: 09/432,337, Filed Nov. 2, 1999, Atty. docket No: 042390.P7626, 15 pgs.

Acharya, et al., "Indexing Wavelet Compressed Video for Efficeint Data Handling", Application No: 09/438,091, Filed: Nov. 10, 1999, 29 pgs.

Acharya, et al., "Method of Upscaling a Color Image", Application No: 09/461,080, Filed: Dec. 14, 1999, 22 pgs.

Acharya, "Method of Converting a Sub–Sampled Color Image", Application No: 09/461,068, Filed: Dec. 14, 1999, 22 pgs.

Acharya, et al., "Chip Rate Selectable Square Root Raised Cosine Filter for Mobile Telecommunications", Application No: 09/467,487, Filed: Dec. 20, 1999, 44 pgs.

Miao, et al., "Dual Mode Filter For Mobile Telecommunications", Application No: 09/467,611, filed: Dec. 20, 1999, 49 pgs.

Metz, et al., "Image Processing Architecture", Application No: 09/473,643, Filed: Dec. 28, 1999, 15 pgs.

Acharya, et al., "Method of Inverse Quantizing Signal Samples of an Image During Image Decompression", Application No: 09/507,213, Filed: Feb. 18, 2000, 32 pgs.

Acharya, et al., "Method of Quantizing Signal Samples of an Image During Compression", Application No: 09/507,399, Filed: Feb. 18, 2000, 24 pgs.

Acharya, et al., "Method of Integrating a Watermark into an Image", Application No: 09/519,874, Filed: Mar. 6, 2000, 27 pgs.

Acharya, et al., "Method of Integrating a Watermark Into a Compressed Image", Application No: 09/519,135, Filed: Mar. 6, 2000, 25 pgs.

Acharya, et al. "Method of Using Hue to Interpolate Color Pixel Signals", Application No: 09/591,867, Filed: Jun. 12, 2000, 23 pgs.

Kim, et al. "Method of Performing Motion Estimation", Application No: 09/596,127, Filed: Jun. 16, 2000, 29 pgs.

Acharya, et al., "Method of Compressing an Image", Application No: 09/597,354, Filed: Jun. 19, 2000, 23 pgs.

Acharya, et al., "Method of Cideo Coding the Movement of a Human Face From a Sequence of Images" Application No: 09/608,989, Filed: Jun. 30, 2000, 25 pgs.

Acharya, et al., "Method of Video Coding Shoulder Movement from a Sequence of Images", Application No: 09/607,724, Filed: Jun. 30, 2000, 25 pgs.

Acharya,et al., "Model–Based Video Image Coding", Application No: 09/608,991, Filed: Jun. 30, 2000, 36 pg.

Acharya, "Techniques to Implement Two–Dimensional Compression", Application No: 09/664,131, Filed: Sep. 18, 2000. 24 pgs.

* cited by examiner

| Run Length | Color of run | |
|---|---|---|
| | white | black |
| 0 | 00110101 | 0000110111 |
| 1 | 000111 | 010 |
| 2 | 0111 | 11 |
| 3 | 1000 | 10 |
| 4 | 1011 | 011 |
| 5 | 1100 | 0011 |
| 6 | 1110 | 0010 |
| ⋮ | ⋮ | ⋮ |
| 64 | 11011 | 0000001111 |
| 128 | 10010 | 000011001000 |
| 192 | 010111 | 000011001001 |
| ⋮ | ⋮ | ⋮ |
| 1728 | 010011011 | 0000001100101 |

| 1 | 1 | 1 | 0 | 0 | 0 | 0 | 0 | 1 | 1 | 0 | 0 | 0 | 1 |

TECHNIQUES TO IMPLEMENT ONE-DIMENSIONAL COMPRESSION

RELATED APPLICATION

This patent application is related to concurrently filed U.S. patent application Ser. No. 09/664,131, titled "Techniques to Implement Two-Dimensional Compression," by Acharya, assigned to the assignee of the present invention and herein incorporated by reference.

BACKGROUND

The present disclosure is related to one-dimensional image compression, such as for bi-level images.

As is well-known, a facsimile machine scans a document line by line and converts each line to alternating black and white dots. The resulting document image is referred to as a bilevel image because each pixel is represented by a single bit and its value may be either 0 to represent a black dot or 1 to represent a white dot or pixel. A combination of run-length encoding and modified Huffman coding has been found suitable to compress such bi-level images. The International Telecommunications Union (ITU, formerly known as Consultative Committee on International Telephone and Telegraph—CCITT) has, therefore, provided a number of standards or specifications suitable to compressing such bi-level facsimile images. See, for example, Hunter, et. al., International Digital Facsimile Coding Standards, Proceedings of the IEEE Vol. 68, No. 7, July 1980, pages 854–857. The CCITT Group 3 is one such standard and is applied to facsimile or "fax" machines. The recommendations for Group 3 has two coding schemes—one dimensional and two dimensional. In the one dimensional scheme, the coding of each scan line is performed independently of any other line. Although this standard was recommended for facsimile machines, the approach is also suitable for coding bi-level document images in various other applications, such as, for example, photocopying machines, scanners, etc.

In photocopying or facsimile systems, the performance of the system may be measured in terms of the number of pages copied per minute. It is difficult to specify copying time per page because this time may vary with the content of the page. However, improving the encoding rate to achieve higher pages per minute is desirable in order to improve performance.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 is a table illustrating codes employed for one-dimensional bi-level image compression; and FIG. 3 is an example of a bit stream to which an encoding methodology may be applied, such as by an embodiment of a circuit in accordance with the present invention.

DETAILED DESCRIPTION

Figure 1:
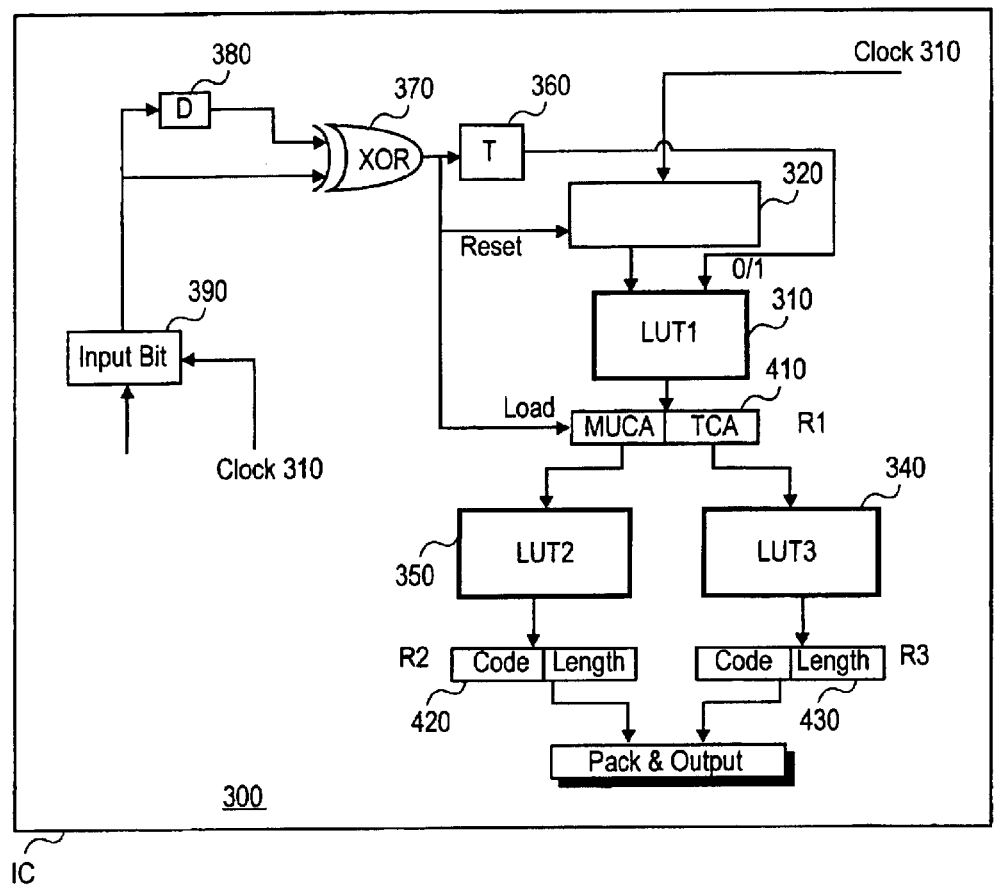
FIG. 1 is a schematic diagram illustrating an embodiment of a circuit to implement one-dimensional compression in accordance with the present invention.

In the following detailed description, numerous specific details are set forth in order to provide a thorough understanding of the invention. However, it will be understood by those skilled in the art that the present invention may be practiced without these specific detailed. In other instances, well-known methods, procedures, components and circuits have not been described in detail so as not to obscure the present invention.

As previously described, the ITU has provided a specification or standard known as CCITT Group 3 that is employed to compress bi-level facsimile images. Although this standard was recommended for facsimile machines, the approach is also suitable for coding bi-level document imaging applications, such as in photocopying machines, scanners, etc. One issue that has lead to compliance with this standard is the timing and synchronization of information to meet communications requirements through the telecommunications channel. Despite this issue, improving the encoding rate to improve the performance of a photocopying system in terms of the number of pages copied is desirable. The encoding rate may be improved, for example, by implementing high speed circuits designed to exploit features of the compression approach employed, as described in more detail hereinafter.

FIG. 1 is a table illustrating codes that may be employed when complying with the aforementioned standard or specification. When one dimensional compression coding is applied in a manner to comply with the aforementioned standard, a scan line is compressed by coding the length of each one of alternating 'runs' of black or white pixels using a pre-specified static Huffman code. Separate code tables are used for black and white runs because the respective statistical distributions are different. Each code table may represent a run-length of up to 1,728 pixels, the maximum length of a scan line in the bi-level image in this particular embodiment. The first 64 entries of the code table is a Huffman code of run-length 0 to 63, respectively. The 64 codes are referred to in this context as termination codes (TC). A binary code of a run-length (L) bigger than 63 is represented using two parts or two codes, a makeup code (MUC) and a termination code (TC). The run length (L) is represented by $$L=64*N+K,$$

the code for L is the MUC to represent 64*N, followed by the TC to represent K. There are 27 entries for the MUCs to represent 64, 128, 192, 256, . . . , 1728, respectively (27 multiples of 64), in the code table followed by the first 64 codes for the TC. Hence, the code table has a total of 91 entries for each color, assuming that 1728 is the maximum length permitted in the CCITT Group 3 standard. Of course, other run length maximums may be employed using a similar procedure.

FIG. 2 is a schematic diagram illustrating an example of the bit stream that may be applied to an embodiment of a circuit to implement one-dimensional compression. It is generally assumed by default that there is an imaginary "white" pixel (1) at the left end of the scan line. Hence, the example scan line in FIG. 3 may be encoded as the following sequence of runs: four white pixels (including the imaginary one), five black pixels, two white pixels, three black pixels, and one white pixel. The coding of the bit stream, here, is ended by an end of line (EOL) code. It is noted, of course, that an alternate default to the left of the scan line, such as a "black" pixel, may be employed in alternative approaches. For this particular bit stream or scan line, the binary code is:

1011 0011 0111 10 000111 0000000001

Although only a few entries are shown of the pre-specified code table in FIG. 2, the entries are well-known and defined in the standard. It is, likewise noted that the code to represent the EOL is "0000000001."

Figure 3:
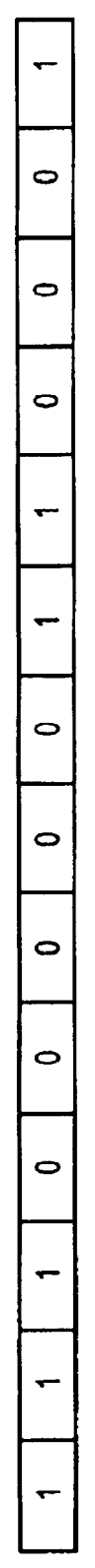

FIG. 3 is a schematic diagram illustrating an embodiment of a circuit to implement one dimensional compression in accordance with the present invention. Although the invention is not restricted in scope in this respect, embodiment 300 is illustrated as implemented on an integrated circuit (IC) chip. As illustrated in FIG. 3, embodiment 300 includes digital logic circuitry, including, in this particular embodiment, buffers, and digital memories. For example, although the invention is not limited in scope in this respect, 330, 340 and 350 comprise digital memories, in this particular embodiment, digital read only memories. Likewise, examples of the digital logic circuitry, include XOR gate 370, toggle switch 360, binary counter 320, delay element 380, and buffers, such as 390, 410, 420 and 430. It will, of course, be appreciated that the invention is not limited in scope to this particular digital logic circuitry and digital memories or to this particular configuration of such components. Nonetheless, as shall be explained in more detail hereinafter, in this embodiment, the digital memories and digital logic circuitry are coupled so as to implement one dimensional compression of a bit stream to be applied to the digital logic circuitry and digital memories.

It is noted that a host of one-dimensional compression processes may be implemented in this particular embodiment in accordance with the invention or in other embodiments in accordance with the invention. Nonetheless, this particular embodiment has the capability to comply with the one-dimensional coding scheme of CCITT Group 3 bi-level compression standard. Again, although the invention is not limited in scope in this respect, one of the digital read only memories comprises, for a plurality run-lengths, a memory address for the makeup code (MUC) and a memory address for the termination code (TC) for the particular run-length. It is noted, in this particular embodiment, that the digital read only memory, here 330, provides these memory addresses, here, a combination of MUCA—Makeup Code Address and TCA—Termination Code Address, for the combination of a particular run-length and a particular color. Likewise, for this particular embodiment, digital read only memory 340 comprises termination codes for the respective termination code addresses (TCA) and digital read only memory 350 comprises makeup codes for the respective makeup code addresses (MUCA).

Referring now to FIG. 3, when a bit stream is applied to this particular embodiment of a circuit to one-dimensional compression, here embodiment 300, the following operation occurs. On each successive pulse of a clock, such as an external clock, here, designated clock 310, the next successive bit of the bit stream is applied to buffer 390. It is assumed, in this particular embodiment, clock 310 comprises an externally derived clock, although, of course, the invention is not necessarily limited in scope in this respect. As clock 310 applies successive pulses, the bits of the bit stream are applied to XOR (EXCLUSIVE OR) gate or circuit 370. Likewise, however, the bits are also applied to delay element 380. Therefore, in this embodiment, XOR gate or circuit 370 is employed to compare two consecutive bits of a bit stream, the current bit and the previous bit delayed by one clock cycle through delay element 380, which, in this particular embodiment, comprises a flip-flop, although, of course, the invention is not limited in scope in this respect.

In this embodiment, if the two bits of the bit stream compared by XOR 370 are identical, 370 provides a "0" output signal. However, once an input bit is received having a binary value the opposite of immediately previous bit, 370 provides a "1" output signal. Therefore, 370, in this particular embodiment, signals the end of a run of pixels of a particular color, here, either black or white. The output signal of 370 is applied to toggle switch 360. In this particular embodiment the switch is implemented also using a flip-flop, here a Toggle or T flip-flop, although, of course the invention is not limited in scope in this respect. The output signal of 360 is toggled when an output signal from 370 applied to 360 comprises a "1." In this particular embodiment, 360 and 380 are initialized to "1" to indicate that initially the runs comprise white pixels, although, an alternative embodiment having a different initialization may be employed. Therefore, when toggle switch 360 toggles to "0," this indicates the end of a run of white pixels and the beginning of a run of black pixels. The output signals of toggle switch 360 remain "0" until the end of the run of black pixels is detected, as indicated by the output signal of 370, in which case toggle switch 360 toggles back to "1." Therefore, in this embodiment, in addition to signaling the end of a run of pixels of a particular color, toggle switch 360 also signals the color of the run, where, in this particular embodiment, 0 indicates a black run and 1 indicates a white run, although, of course, the invention is not limited in scope in this respect.

In this particular embodiment, binary counter 320 comprises a binary up counter, although, of course, the invention is not limited in scope in this respect. Counter 320, as illustrated in FIG. 3, counts the length of the run of a particular color. At the end of the run, that is, in this embodiment, when the output signal of gate 370 is "1," counter 320 is reset to "0." When the run ends, the length of the run is the output signal of counter 320, which, in this particular embodiment, is applied to form an address to a memory location of digital read only memory 330, which, in this particular embodiment, operates as a "look up table" (LUT). In addition to applying the output signal of the counter 320 to memory 330, toggle switch 360 applies an output signal to signal the color of the run, in this particular embodiment, 0 for black and 1 for white. A combination of these two signals from 320 and 360 indicates an address in memory 330 to be read and loaded into register 410. Likewise, as illustrated in FIG. 3, for this particular embodiment, the output signal of 370 is also employed as a "load" signal for register 410. Therefore, when the output signal of 370 comprises a 1, a makeup code address (MUCA) and termination code address (TCA) of the corresponding run length of pixels is loaded from memory 330 into register or buffer 410. Then, as illustrated further in FIG. 3, memories 350 and 340, respectively, provide a makeup code (MUC) and termination code (TC), and corresponding length information. Both MUC and TC comprise variable-length codes. Therefore, this information is employed to properly output the code. The makeup code address and termination code address, previously loaded into register 410, are respectively applied to memories 350 and 340. Memories 350 and 340 provide these codes as output signals which are then packed and output by a pack and output circuit, such as illustrated in FIG. 3.

Although the invention is not limited in scope in this respect, one advantage of the embodiment, illustrated in FIG. 3 is that a one dimensional compression process, in this embodiment the one-dimentional mode of the CCITT Group 3 bi-level compression process, has been implemented without employing any arithmetic operations. In this context, arithmetic operations are distinguished from digital logic operations. Arithmetic operations typically involve a higher level of circuit complexity to implement in order to perform, for example, carrys as well as other more complex operations, Therefore, not employing arithmetic operations provides a number of advantages. It allows the one dimensional compression process to be implemented with a lower complexity circuit architecture, which has the associated advantages of lower power and lower cost. In addition, although this invention is not limited in scope in this respect, this particular embodiment should also achieves a higher encoding rate, which should result in higher pages per minute of performance, as previously described. A reason this particular embodiment should result in faster encoding is because, typically, the implementation of arithmetic operations will introduce additional delay not present for the embodiment illustrated in FIG. 3. Therefore, this particular embodiment of a circuit to implement one-dimensional compression provides a number of advantages over alternative approaches, such, for example, alternative approaches that employ a general purpose processor or microprocessor to implement such compression processes.

While certain features of the invention have been illustrated and detailed herein, many modifications, substitutions, changes and equivalents will now occur to those skilled in the art. It is, therefore, to be understood that the appended claims are intended to cover all such modifications and changes as fall within the true spirit of the invention.

What is claimed is:

1. An integrated circuit comprising:

digital logic circuitry and digital memories; and said digital logic circuitry and digital memories being coupled so as to implement one dimensional compression of a bit stream to be applied to said digital logic circuitry and digital memories, wherein one of the digital memories stores, for a plurality of run lengths, a memory address for a make up code (MUC) and a memory address for a termination code (TC) for the respective run lengths.

2. The integrated circuit of claim 1, wherein a circuit configuration of said digital logic circuitry and digital memories is coupled to implement said one dimensional compression of the bit stream without performing arithmetic operations.

3. The integrated circuit of claim 1, wherein said one dimensional compression to be implemented complies with the one-dimensional coding mode in the CCITT Group 3 bi-level compression standard.

4. The integrated circuit of claim 1, wherein said digital memories comprise read only memories.

5. The integrated circuit of claim 4, wherein said digital read only memories comprise three digital read only memories.

6. The integrated circuit of claim 1, wherein one of the digital memories stores the make up codes (MUC) and one of the digital memories stores the termination codes (TC).

7. The integrated circuit of claim 6, wherein the digital logic circuitry includes a binary counter and a toggle switch;

said binary counter being coupled so as to count the length of a run; and said toggle switch being coupled so as to signal the end and color of a run.

8. The integrated circuit of claim 1, wherein the digital logic circuitry includes a binary counter and a toggle switch;

said binary counter being coupled so as to count the length of a run; and said toggle switch being coupled so as to signal the end and color of a run.

9. The integrated circuit of claim 1, wherein at least one of said digital memories comprises, for a plurality of run length and color pairs, a make up code address and termination code address.

10. A method of implementing the compression of a one dimensional bit stream comprising:

converting the length of a run and the color of a run into a make up code (MUC) address and a termination code (TC) address using digital logic circuitry without performing arithmetic operations.

11. The method of claim 10, and further comprising:

converting the MUC address into an MUC; and converting the TC address into a TC.

12. The method of claim 11, wherein converting the MUC address into an MUC comprises performing a table look-up operation.

13. The method of claim 11, wherein converting the TC address into a TC comprises performing a table look-up operation.

14. A document processing system comprising:

system components to perform bi-level compression of a document to be processed;

at least one of said system components including: digital logic circuitry and digital memories coupled so as to implement one dimensional compression of a bit stream representing contents of the document to be processed, wherein the digital logic circuitry includes a binary counter and a toggle switch, said binary counter being coupled so as to count the length of a run and said toggle switch being coupled so as to signal the end and color of a run.

15. The document processing system of claim 14, wherein said one dimensional compression to be implemented complies with the one-dimensional coding mode in the CCITT Group 3 bi-level compression standard.

16. The document processing system of claim 14, wherein said at least one system component is coupled to generate a make up code address (MUCA) and termination code address (TCA) from said length and color.

* * * * *